United States Patent
Awad et al.

(10) Patent No.: US 9,428,819 B1
(45) Date of Patent: Aug. 30, 2016

(54) METHOD FOR SYNTHESIZING NOBLE METAL NANOPARTICLES USING DEAD CANCER CELLS

(71) Applicant: KING SAUD UNIVERSITY, Riyadh (SA)

(72) Inventors: Manal Ahmed Gasmelseed Awad, Riyadh (SA); Awatif Ahmed Hendi, Riyadh (SA); Khalid Mustafa Osman Ortashi, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 15/003,265

(22) Filed: Jan. 21, 2016

(51) Int. Cl.
*B22F 9/24* (2006.01)
*B82Y 40/00* (2011.01)
*C22B 3/00* (2006.01)
*C22B 7/00* (2006.01)
*C22B 3/22* (2006.01)
*B22F 1/00* (2006.01)

(52) U.S. Cl.
CPC .......... *C22B 11/042* (2013.01); *B22F 1/0044* (2013.01); *B22F 9/24* (2013.01); *C22B 3/22* (2013.01); *C22B 7/007* (2013.01); *C22B 7/008* (2013.01); *B22F 2009/245* (2013.01); *B22F 2301/255* (2013.01); *B22F 2304/054* (2013.01); *B22F 2304/056* (2013.01); *B82Y 40/00* (2013.01)

(58) Field of Classification Search
None
See application file for complete search history.

(56) References Cited

U.S. PATENT DOCUMENTS

| 8,394,421 B2 | 3/2013 | Mansoori et al. | |
| 8,735,538 B1* | 5/2014 | DiSpirito | C12P 3/00 530/206 |
| 9,291,618 B2* | 3/2016 | Hendi | G01N 33/52 |
| 2009/0087892 A1* | 4/2009 | Champion | C10G 1/00 435/168 |
| 2010/0200501 A1* | 8/2010 | Hoag | B22F 1/0018 210/620 |
| 2013/0129618 A1* | 5/2013 | Katti | A61K 41/00 424/1.29 |
| 2015/0148870 A1* | 5/2015 | Hendi | B22F 9/24 607/88 |

OTHER PUBLICATIONS

Nejad, M. et al., "Streptomyces somaliensis mediated green synthesis of silver nanoparticles", Nanomedical Journal, vol. 2, No. 3, Summer 2015, pp. 217-222.*
Ray, S. et al., "Extracellular biosynthesis of silver nanoparticles using the mycorrhizal mushroom Tricholoma crassum (Berk.) Sacc.: Its antimicrobial activity against pathogenic bacteria and fungus, including multidrug resistant plant and human bacteria", Digest Journal of Nanomaterials and Biostructures, Jul.-Sep. 2011, pp. 1289-1299.*
Saxena, J. et al., "Emerging role of fungi in nanoparticle synthesis and their applications", World Journal of Pharmacy and Pharmaceutical Sciences, vol. 3, issue 9, 2014, pp. 1586-1613.*
Wrótniak-Drzewiecka et al., "Novel Approach towards Synthesis of Silver Nanoparticles from Myxococcus virescens and their Lethality on Pathogenic Bacterial Cells" *Austin J Biotechnol Bioeng.*, 2014, vol. 1, 7.

* cited by examiner

*Primary Examiner* — George Wyszomierski
(74) *Attorney, Agent, or Firm* — Richard C. Litman

(57) ABSTRACT

A method for preparing noble metal nanoparticles from dead cancer cells includes reacting an aqueous metal ion solution with an aqueous solution including dead cultured cancer cells to obtain a nanoparticle mixture, and isolating the nanoparticles from the mixture. The noble metal nanoparticles can be synthesized by using the dead cultured cancer cells with the media solution thereof or by using dead cancer cells from which cell culture media has been removed. The aqueous metal ion solution can include silver nitrate ($AgNO_3$) and the noble metal nanoparticles formed can be silver nanoparticles. The metal ion solution can include chloroauric acid ($HAuCl_4$) and the noble metal nanoparticles formed can be gold nanoparticles. The dead cultured cancer cells can include TK6 lymphoblastoid cell lines.

9 Claims, 8 Drawing Sheets

METHOD FOR SYNTHESIZING NOBLE METAL NANOPARTICLES USING DEAD CANCER CELLS

BACKGROUND OF THE INVENTION

1. Field of the Invention

The present invention relates to a method of "green" biosynthesis of noble metal nanoparticles using dead cancer cells as a reducing agent.

2. Description of the Related Art

Nanotechnology is emerging as a rapidly growing field primarily for manufacturing new materials at the nanoscale level. Nanoparticles exhibit completely new or improved properties compared to their corresponding bulk materials. Because of their size, catalytic property, ability to deliver drug, increased efficacy, and decreased toxicity, nanotechnology finds applications in various fields including healthcare, defense and day-to-day life. Because the nanoparticles possess a very high surface to volume ratio, they are particularly useful in applications where high surface areas are critical for success.

Nanomaterials are typically synthesized by heat evaporation, non-sputtering, solvothermal reduction, electrochemical technique, chemical reduction, photochemical, reverse micelles, thermal decomposition, radiation assisted methods, electrochemical methods, or sonochemical methods including microwave assisted method. However, in the past two decades, synthesis of metal nanoparticles using microorganisms has received great interest. The microorganisms can be used as possible "nanofactories" for development of clean, nontoxic and environmentally friendly methods for producing nanoparticles. The nanoparticles are biosynthesized when the microorganisms grab target ions from their environment and then turn the metal ions into the elemental metal through enzymes generated by the cell activities. It can be intracellular and extracellular synthesis according to the location where nanoparticles are formed. The extracellular synthesis of nanoparticles involves trapping the metal ions on the surface of the cells and reducing them in the presence of enzymes. In intracellular synthesis, ions are transported into the microbial cell to form nanoparticles in the presence of enzymes. The biosynthesized nanoparticles have wide applications such as drug carriers for targeted delivery, cancer treatment, gene therapy, DNA analysis, antibacterial agents, biosensors, separation science, and magnetic resonance imaging.

Thus, a method of synthesizing noble metal nanoparticles utilizing cultured dead cancer cells thereby solving the aforementioned problems is desired.

SUMMARY OF THE INVENTION

A method for preparing noble metal nanoparticles from dead cancer cells can include reacting an aqueous metal ion solution with an aqueous solution including dead cultured cancer cells to obtain a nanoparticle mixture, and isolating the nanoparticles from the mixture. The noble metal nanoparticles can be synthesized by using the dead, cultured cancer cells with the media solution thereof or by using dead cancer cells from which cell culture media has been removed. The aqueous metal ion solution can include silver nitrate ($AgNO_3$) and the noble metal nanoparticles formed can be silver nanoparticles. The metal ion solution can include chloroauric acid ($HAuCl_4$) and the noble metal nanoparticles formed can be gold nanoparticles. Alternatively, the metal ion solution can include silver and gold ions together. The dead cancer cells can include TK6 lymphoblastoid cell lines.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
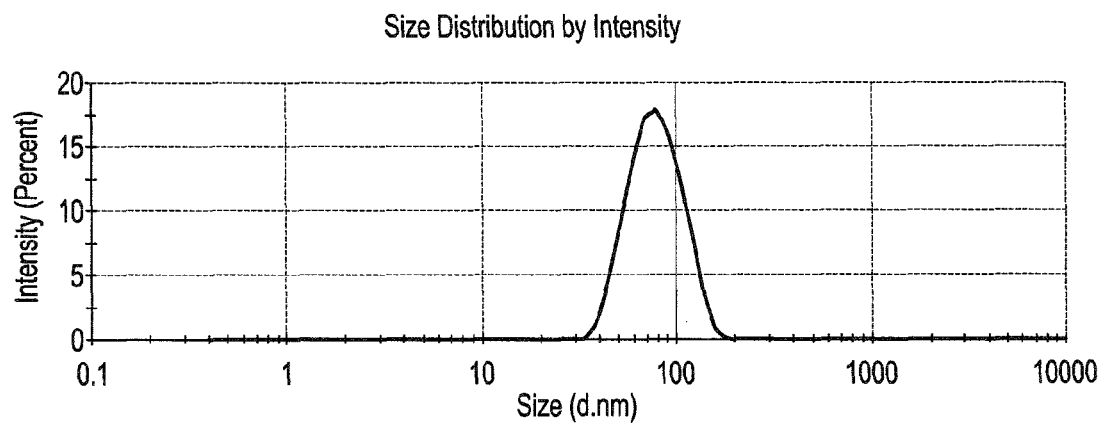
FIG. 1 shows the particle average size determination by Zetasizer for the silver nanoparticles synthesized according to the method of the present invention.

A method for preparing noble metal nanoparticles from dead cancer cells can include reacting an aqueous metal ion solution with an aqueous solution including dead cultured cancer cells to obtain a nanoparticle mixture, and isolating the nanoparticles from the mixture. The noble metal nanoparticles can be synthesized by using the dead cultured cancer cells with the media solution thereof or by using dead cancer cells from which cell culture media has been removed. The aqueous metal ion solution can include silver nitrate ($AgNO_3$) and the noble metal nanoparticles formed can be silver nanoparticles. The metal ion solution can include chloroauric acid ($HAuCl_4$) and the noble metal nanoparticles formed can be gold nanoparticles. The metal ion solution can include two different metal ions and the noble metal nanoparticles formed can be bimetallic, e.g., gold and silver nanoparticles. The nanoparticles can have applications as anti-cancer agents, antifungal agents, and/or antibacterial agents.

The method of preparing noble metal nanoparticles from dead cancer cells can include adding a metal ion solution directly to a cancer cell solution to form a final solution. The cancer cell solution can be an aqueous solution including dead cultured cancer cells and the cell culture media in which the cells are cultured. The final solution can be incubated for a period of at least 10 days, and preferably about 10 days to about 20 days, at a temperature ranging from about 35° C. to about 40° C. to obtain a nanoparticle solution. A change in color in the final solution can indicate the formation of the noble metal nanoparticles. The nanoparticles can be isolated from the nanoparticle solution and dried by conventional methods. The metal ion solution can include silver nitrate ($AgNO_3$) and the noble metal nanoparticles formed can be silver nanoparticles. The metal ion solution can include chloroauric acid ($HAuCl_4$) and the noble metal nanoparticles formed can be gold nanoparticles. The metal ion solution can be, for example, an aqueous solution of silver nitrate ($AgNO_3$) or an aqueous solution of chloroauric acid ($HAuCl_4$). The dead cultured cancer cells can include TK6 lymphoblastoid cell lines.

Alternatively, the method of preparing noble metal nanoparticles from dead cancer cells can include separating dead cancer cells from a medium used for culturing the dead cancer cells. For example, the solution of dead cultured cancer cells can be centrifuged, and the resulting pellets can be retained. Any remaining media on the pellets (cells) can be washed by adding water to the pellets and centrifuging. The pellets or biomass can then be added to a metal ion solution to provide a final solution. A change in color in the final solution can indicate the formation of the noble metal nanoparticles. The metal ion solution can include silver nitrate ($AgNO_3$) and the noble metal nanoparticles formed can be silver nanoparticles. The metal ion solution can include chloroauric acid ($HAuCl_4$) and the noble metal nanoparticles formed can be gold nanoparticles. The metal ion solution can be, for example, an aqueous solution of silver nitrate ($AgNO_3$) or an aqueous solution of chloroauric acid ($HAuCl_4$). The dead cultured cancer cells can include TK6 lymphoblastoid cell lines.

Figure 2:
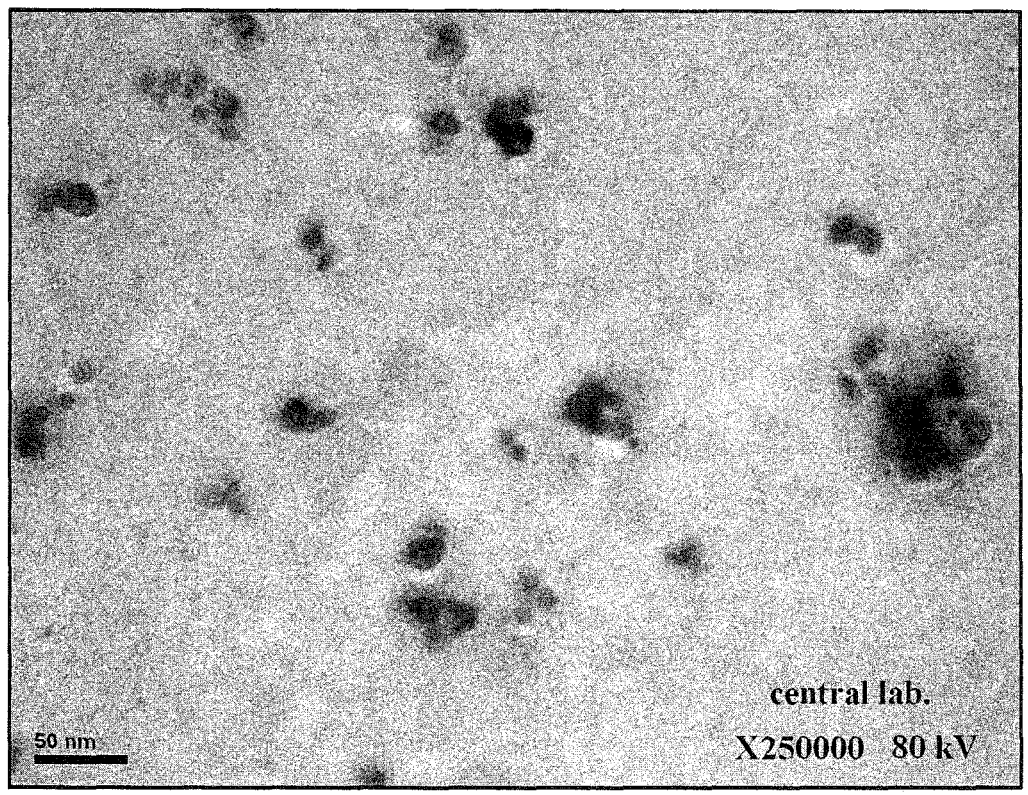
FIG. 2 shows the Transmission Electron Micrograph (TEM) image of the silver nanoparticles produced according to the method of the present invention
Figure 3:
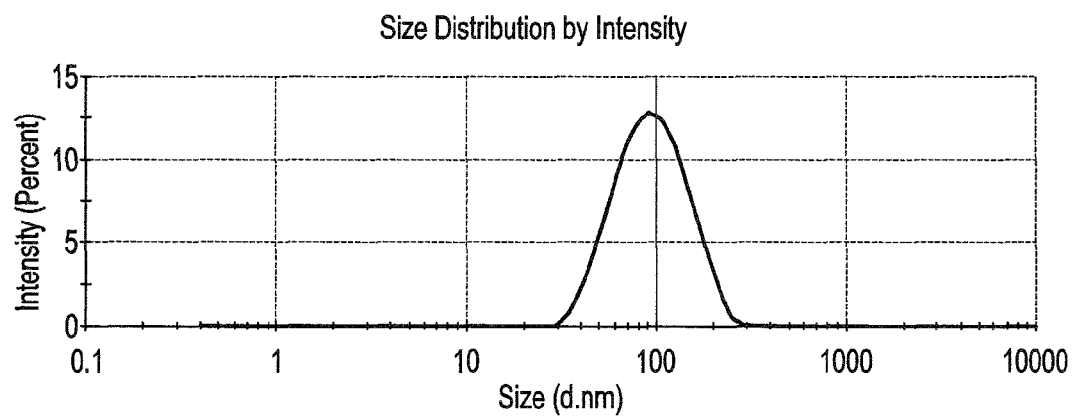
FIG. 3 shows the particle average size determination by Zetasizer for the gold nanoparticles synthesized according to the method of the present invention.
Figure 4A:
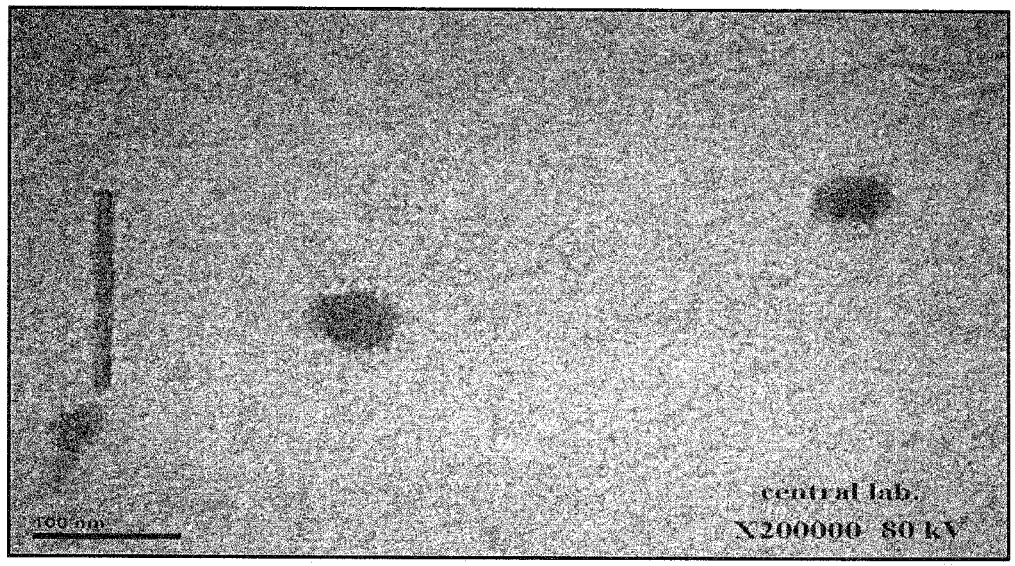
FIGS. 4A and 4B shows the TEM image of the gold nanoparticles synthesized according to the method of the present invention
Figure 4B:
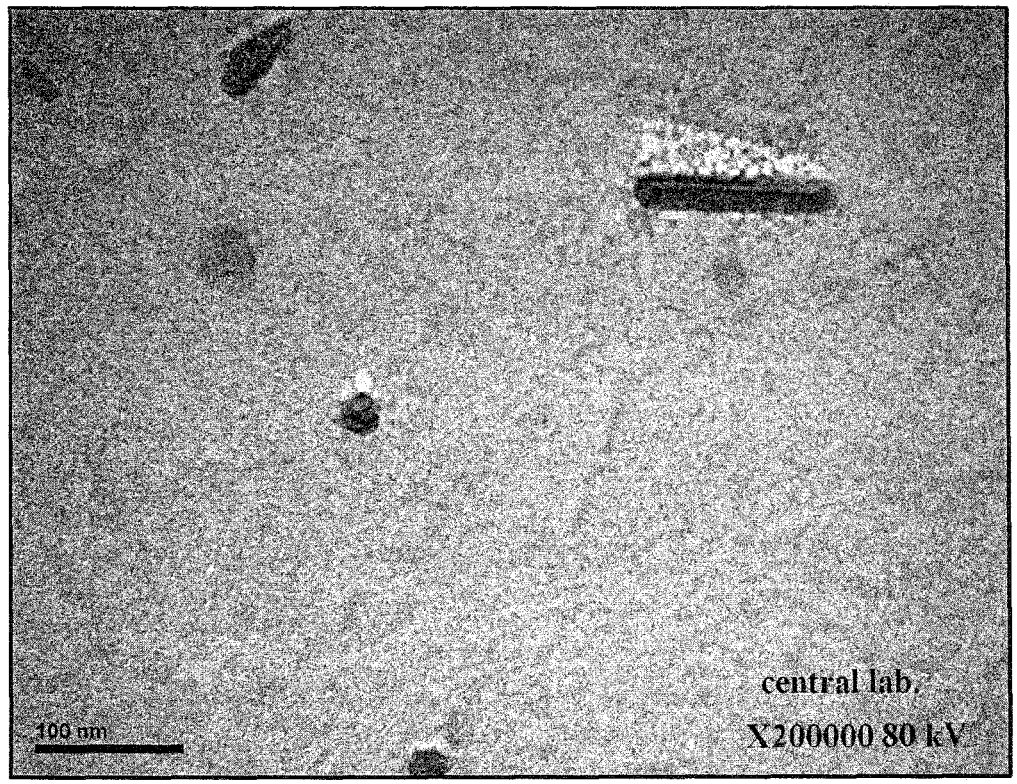

The noble metal nanoparticles synthesized using dead cancer cells can have a mean diameter in the range of from about 5 nm to about 200 nm in diameter, such as about 50 nm to about 150 nm, and preferably about 50 nm. FIG. 1 shows the particle average size determination by Zetasizer for the silver nanoparticles formed according to the present teachings. FIG. 3 shows the particle average size determination by Zetasizer for the gold nanoparticles formed according to the present teachings. FIG. 2 shows the Transmission Electron Micrograph (TEM) image of the silver nanoparticles formed according to the present teachings. FIG. 4A and FIG. 4B show the TEM image of the gold nanoparticles formed according to the present teachings. The noble metal nanoparticles can have various shapes, including, spherical, spheroidal, elongated spherical, rod-shaped, triangular, and/or faceted-shape.

Figure 5:
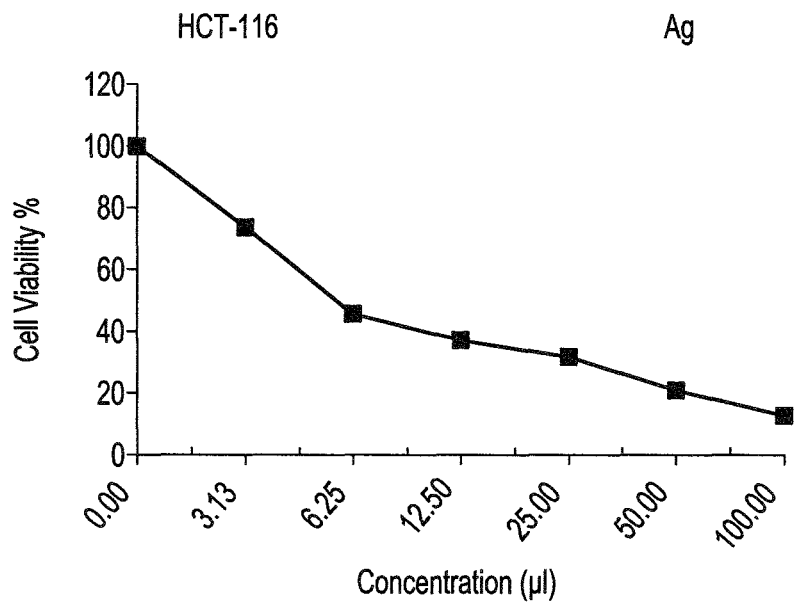
FIG. 5 is a graph showing the inhibitory activity of the silver nanoparticles against colon carcinoma cells.

The noble metal nanoparticles can be formulated in a composition as an anti-cancer agent. In vitro cell viability assays were performed for various cancer cell lines using the noble metal nanoparticle synthesized according to the present teachings. FIG. 5 and Table 1 show the inhibitory activity of the silver nanoparticles synthesized according to the methods described herein against colon carcinoma cells. From the plot, the $IC_{50}$ value was determined to be 5.76 µl.

TABLE 1

| Sample conc. | Viability % (3 Replicates) | | | | Inhibition | Standard Deviation |
|---|---|---|---|---|---|---|
| (µl) | 1 st | 2 nd | 3 rd | Mean | % | (±) |
| 100 | 12.64 | 14.03 | 11.97 | 12.88 | 87.12 | 1.05 |
| 50 | 18.56 | 20.74 | 23.65 | 20.98 | 79.02 | 2.55 |
| 25 | 29.78 | 31.52 | 34.18 | 31.83 | 68.17 | 2.22 |
| 12.5 | 35.28 | 37.14 | 39.24 | 37.22 | 62.78 | 1.98 |
| 6.25 | 43.27 | 46.02 | 47.63 | 45.64 | 54.36 | 2.20 |
| 3.125 | 75.19 | 71.36 | 74.29 | 73.61 | 26.39 | 2.00 |
| 0 | 100 | 100 | 100 | 100 | 0.00 | |

Figure 6:
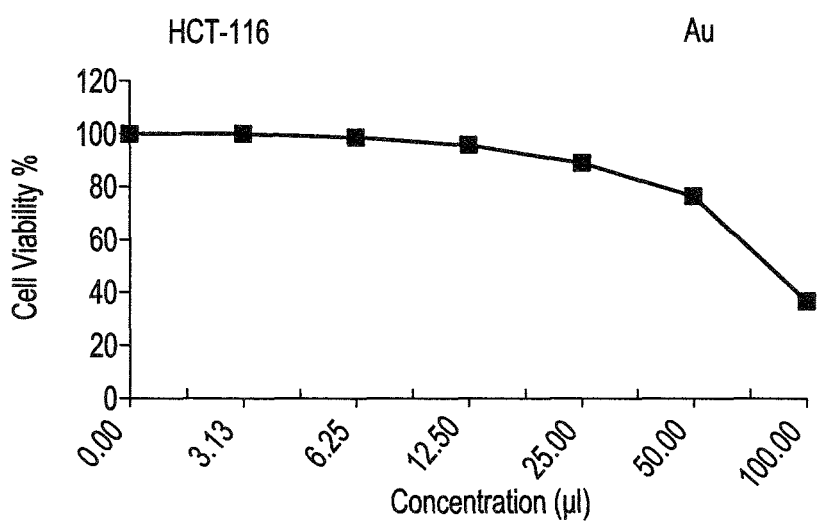
FIG. 6 is a graph showing the inhibitory activity of the gold nanoparticles against colon carcinoma cells.

FIG. 6 and Table 2 show the inhibitory activity of gold nanoparticles synthesized according to the methods described herein against colon carcinoma cells (HCT-116). From the plot, the $IC_{50}$ value was determined to be 83.4 µl.

TABLE 2

| Sample conc. | Viability % (3 Replicates) | | | | Inhibition | Standard Deviation |
|---|---|---|---|---|---|---|
| (µl) | 1 st | 2 nd | 3 rd | Mean | % | (±) |
| 100 | 36.94 | 39.21 | 34.18 | 36.78 | 63.22 | 2.52 |
| 50 | 74.52 | 78.71 | 76.26 | 76.50 | 23.50 | 2.11 |
| 25 | 87.16 | 90.32 | 89.48 | 88.99 | 11.01 | 1.64 |
| 12.5 | 94.22 | 97.83 | 95.29 | 95.78 | 4.22 | 1.85 |
| 6.25 | 98.84 | 100 | 97.41 | 98.75 | 1.25 | 1.30 |
| 3.125 | 100 | 100 | 100 | 100.00 | 0.00 | 0.00 |
| 0 | 100 | 100 | 100 | 100 | 0.00 | |

Figure 7:
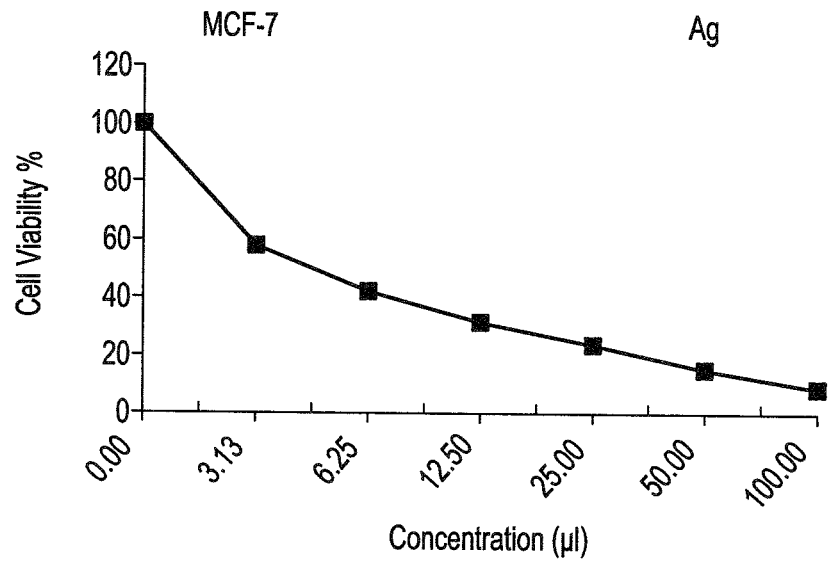
FIG. 7 is a graph showing the inhibitory activity of the silver nanoparticles against breast carcinoma cells.

FIG. 7 and Table 3 show the inhibitory activity of the silver nanoparticles synthesized according to the methods described herein against breast carcinoma cells (MCF-7). From the plot, the $IC_{50}$ value was determined to be 4.68 µl.

TABLE 3

| Sample conc. | Viability % (3 Replicates) | | | | Inhibition | Standard Deviation |
|---|---|---|---|---|---|---|
| (µl) | 1 st | 2 nd | 3 rd | Mean | % | (±) |
| 100 | 8.74 | 10.16 | 7.42 | 8.77 | 91.23 | 1.37 |
| 50 | 14.12 | 16.38 | 15.29 | 15.26 | 84.74 | 1.13 |
| 25 | 19.78 | 27.15 | 24.38 | 23.77 | 76.23 | 3.72 |
| 12.5 | 28.43 | 34.29 | 31.76 | 31.49 | 68.51 | 2.94 |
| 6.25 | 37.62 | 48.87 | 39.65 | 42.05 | 57.95 | 6.00 |
| 3.125 | 54.91 | 61.75 | 56.82 | 57.83 | 42.17 | 3.53 |
| 0 | 100 | 100 | 100 | 100 | 0.00 | |

Figure 8:
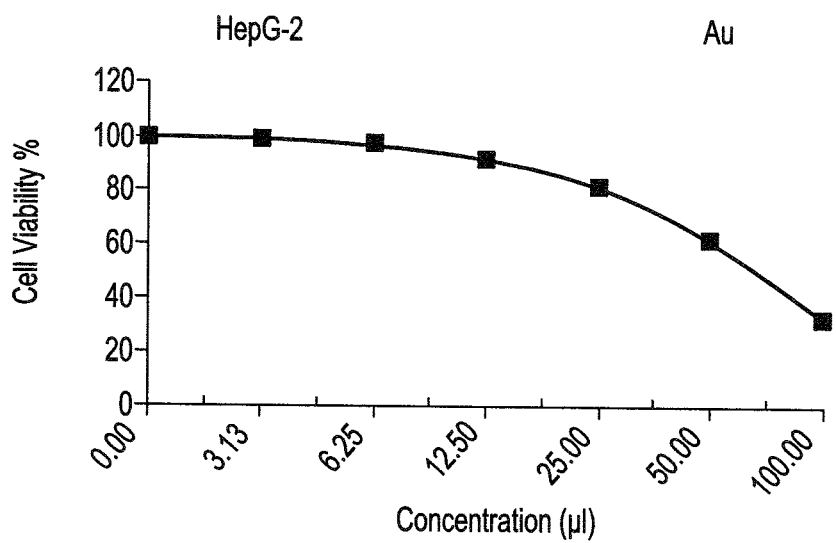
FIG. 8 is a graph showing the inhibitory activity of the gold nanoparticles against Hepatocellular carcinoma cells.

FIG. 8 and Table 4 show the inhibitory activity of gold nanoparticles synthesized according to the methods described herein against Hepatocellular carcinoma cells (HepG-2). From the plot, the IC50 value was determined to be 70 µl.

TABLE 4

| Sample conc. | Viability % (3 Replicates) | | | | Inhibition | Standard Deviation |
|---|---|---|---|---|---|---|
| (µl) | 1 st | 2 nd | 3 rd | Mean | % | (±) |
| 100 | 29.78 | 34.56 | 31.72 | 32.02 | 67.98 | 2.40 |
| 50 | 63.85 | 61.43 | 60.54 | 61.94 | 38.06 | 1.71 |
| 25 | 86.21 | 80.97 | 78.69 | 81.96 | 18.04 | 3.86 |
| 12.5 | 93.46 | 91.85 | 90.58 | 91.96 | 8.04 | 1.44 |
| 6.25 | 98.73 | 97.13 | 96.42 | 97.43 | 2.57 | 1.18 |
| 3.125 | 100 | 100 | 98.73 | 99.58 | 0.42 | 0.73 |
| 0 | 100 | 100 | 100 | 100 | 0.00 | |

Figure 9:
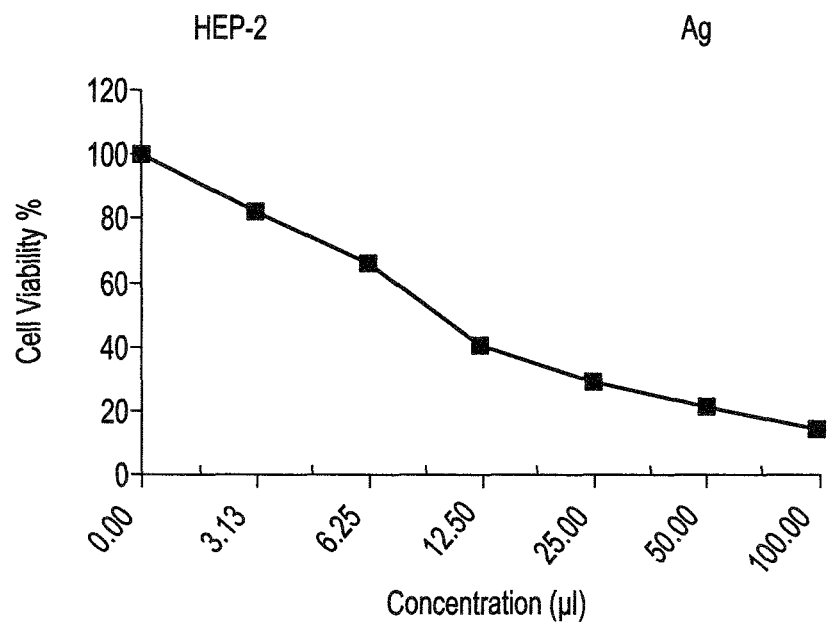
FIG. 9 is a graph showing the inhibitory activity of the silver nanoparticles against Larynx carcinoma cells (HEP-2)

FIG. 9 shows the inhibitory activity of the silver nanoparticles synthesized according to the methods described herein against Larynx carcinoma cells (HEP-2). From the plot, the IC50 value was determined to be 10.2 µl.

TABLE 5

| Sample conc. | Viability % (3 Replicates) | | | | Inhibition | Standard Deviation |
|---|---|---|---|---|---|---|
| (μl) | 1 st | 2 nd | 3 rd | Mean | % | (±) |
| 100 | 13.69 | 14.57 | 15.02 | 14.43 | 85.57 | 0.68 |
| 50 | 21.87 | 20.38 | 23.65 | 21.97 | 78.03 | 1.64 |
| 25 | 30.68 | 27.94 | 28.89 | 29.17 | 70.83 | 1.39 |
| 12.5 | 41.93 | 39.56 | 40.04 | 40.51 | 59.49 | 1.25 |
| 6.25 | 65.12 | 68.73 | 64.47 | 66.11 | 33.89 | 2.30 |
| 3.125 | 81.43 | 85.21 | 79.35 | 82.00 | 18.00 | 2.97 |
| 0 | 100 | 100 | 100 | 100 | 0.00 | |

The noble metal nanoparticles prepared by the present methods can be formulated into a composition effective as an antifungal and as an antibacterial agent (Gram positive and gram negative). Table 6 shows the antimicrobial activity of a suspension including the nanoparticle synthesized according to the methods described herein against various microorganisms. The fungal and bacterial inhibition trial was conducted using the diffusion Agar technique. The data are expressed in the form of (M±S.D.): mean±standard deviation; wherein M represents the diameter of the inhibition zone, measured in millimeters (mm) beyond the initial well diameter of 6 mm.

TABLE 6

| Tested microorganisms | Sample | | |
|---|---|---|---|
| | Bio AgNPs | Bio AuNPs | Standard Drugs |
| FUNGI | | | Amphotericin B |
| *Aspergillus fumigatus* (RCMB 02567) | 17.3 ± 1.2 | 16.7 ± 6.7 | 21.7 ± 1.5 |
| Gram Positive Bacteria: | | | Ampicillin |
| *Streptococcus pneumoniae* (RCMB 010011) | 18.3 ± 1.2 | 19.3 ± 0.58 | 21.0 ± 1.0 |
| *Bacillis subtilis* (RCMB 010068) | 22.7 ± 1.5 | 21.0 ± 1.0 | 31.3 ± 1.5 |
| Gram negative Bacteria: | | | Gentamicin |
| *Escherichia coli* (RCMB 010054) | 18.0 ± 2.0 | 18.7 ± 1.5 | 20.3 ± 0.58 |

The following examples will further illustrate the "green" processes for making noble metal nanoparticles using dead cancer cells, but are not intended to limit its scope.

Example 1

Preparing Silver Nanoparticles Using Dead Cultured Cancer Cells with Media

About 10 ml of dead cultured cancer cells (TK6 lymphoblastoid cell lines) in media solution was added to about 40 ml distilled water. About 10-15 mg of silver nitrate ($AgNO_3$) was added to the dead cultured cancer cells solution and the resulting final solution was incubated at about 35-39° C. for about 10-20 days. After this incubation period, a color change from pink to brown was observed, indicating the formation of silver nanoparticles. Then, the solution was centrifuged at about 13000 rpm for about 5 minutes and the pellets were collected and dried in an oven at 150-250° C. The resulting powder included silver nanoparticles.

Example 2

Preparing Silver Nanoparticles Using Dead Cultured Cancer Cells without Media

A media solution of dead cultured cancer cells was centrifuged at 2500 rpm for 5 minutes. The resulting pellets were kept and supernatant fluid was discarded. Then about 30 ml of sterile distilled water was added to the pellets for washing the media from the dead cells. The biomass was then separated from the sterile distilled water by centrifuging at 2000 rpm for about 10 minutes. The pellets were weighed and then were used for the synthesis of noble metal nanoparticles. For synthesizing silver nanoparticles, about 0.2-0.3 grams of wet biomass was added to about 10 ml of a sterilized aqueous solution of 1 mM silver nitrate (1 mM $AgNO_3$). The resulting solution was mixed by vortexing for about 5 minutes. Then the resulting final solution was incubated at about 35-39° C. for about 10-14 days during which time the color changed from colorless to brown, indicating the formation of silver nanoparticles. The resulting final solution was then centrifuged at about 13000 rpm for about 5 minutes. The resulting pellets were collected and dried in an oven at about 150-250° C. A powder including the silver nanoparticles was collected.

Example 3

Preparing Gold Nanoparticles Using Dead Cultured Cancer Cells with Media

About 10 ml of dead cultured cancer cells (TK6 lymphoblastoid cell lines) media solution was added to about 40 ml distilled water. About 18-24 mg of chloroauric acid ($HAuCl_4$) was added to the media solution and the resulting final solution was incubated at about 35-39° C. for about 10-20 days. A change of color was observed, indicating the formation of gold nanoparticles. Then the resulting solution was centrifuged at 13000 rpm for 5 minutes to obtain pellets. The pellets were dried in an oven at a temperature of about 150-250° C. The resulting powder included gold nanoparticles.

Example 4

Preparing Gold Nanoparticles Using Dead Cultured Cancer Cells without Media

A media solution of dead cultured cancer cells was centrifuged at 2500 rpm for 5 minutes. The resulting pellets were kept and supernatant fluid was discarded. Then about 30 ml of sterile distilled water was added to the pellets for washing the media from the dead cells. The biomass was then separated from the sterile distilled water by centrifuging at 2000 rpm for about 10 minutes. The pellets were weighed and then were used for the synthesis of noble metal nanoparticles. About 0.2-0.3 grams of wet biomass of dead cultured cancer cells was added to about 10 ml of a sterilized aqueous solution of about 1 mM Chloroauric acid (1 mM HAuCl4) and the resulting solution was vortexed for 5 minutes. Then, this resulting final solution was incubated at about 35-39° C. for about 10-14 days. A color change from a colorless to dark pink color was observed, which indicated the formation of the gold nanoparticles. The resulting solution was then centrifuged at 13000 rpm for about 5 minutes and the resulting solution was collected as pellets and dried in an oven 150-250° C. The resulting powder included nanoparticles.

It is to be understood that the present invention is not limited to the embodiments described above, but encompasses any and all embodiments within the scope of the following claims.

We claim:

1. A method for synthesizing noble metal nanoparticles using dead cancer cells, comprising:
   a) reacting an aqueous metal ion solution with an aqueous solution including dead cancer cells to obtain a nanoparticle solution, and
   b) isolating the nanoparticles from the nanoparticle solution.

2. The method for synthesizing noble metal nanoparticles using dead cancer cells according to claim 1, wherein the aqueous solution including dead cancer cells includes dead cancer cells and culture media thereof.

3. The method for synthesizing noble metal nanoparticles using dead cancer cells according to claim 1, further comprising separating dead cancer cells from a culture medium before reacting the dead cancer cell solution with the metal ion solution.

4. The method for synthesizing noble metal nanoparticles using dead cancer cells according to claim 1, wherein the aqueous metal ion solution includes silver nitrate (AgNO3) and the noble metal nanoparticles formed are silver nanoparticles.

5. The method for synthesizing noble metal nanoparticles using dead cancer cells according to claim 1, wherein the aqueous metal ion solution includes chloroauric acid (HAuCl4) and the noble metal nanoparticles formed are gold nanoparticles.

6. The method for synthesizing noble metal nanoparticles using dead cancer cells according to claim 1, wherein the aqueous metal ion solution comprises a mixture of two metal ions and the nanoparticles formed are bimetallic nanoparticles.

7. The method for synthesizing noble metal nanoparticles using dead cancer cells according to claim 1, wherein the dead cancer cell solution includes TK6 lymphoblastoid cell lines.

8. The method for synthesizing noble metal nanoparticles using dead cancer cells according to claim 1, wherein the nanoparticles are isolated from the nanoparticle solution by centrifugation.

9. The method for synthesizing noble metal nanoparticles using dead cancer cells according to claim 1, wherein the metal nanoparticles have a mean diameter in the range of from about 50 nm to about 150 nm.

* * * * *